May 18, 1926.
J. M. PERICLE
SNAP HOOK
Filed August 5, 1925
1,585,314
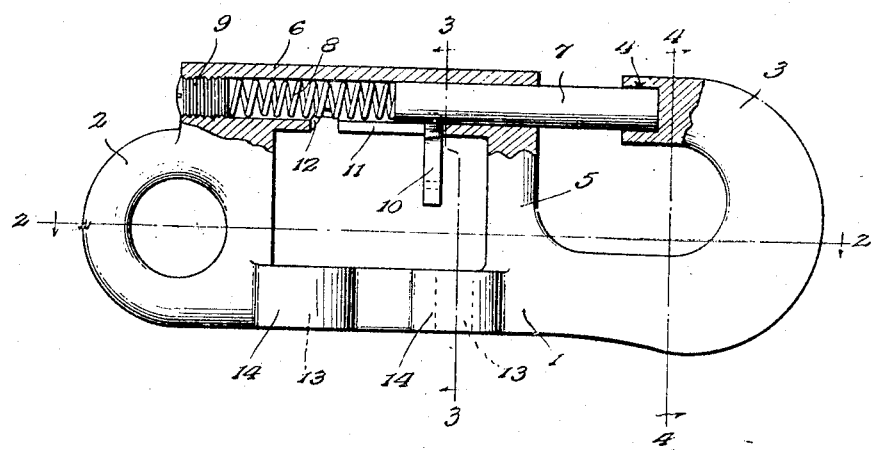
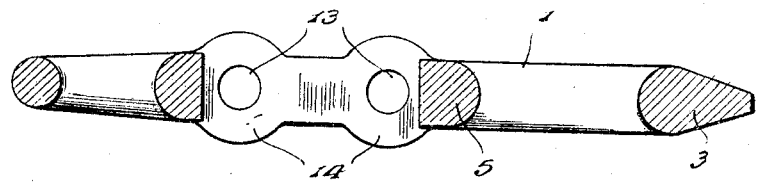
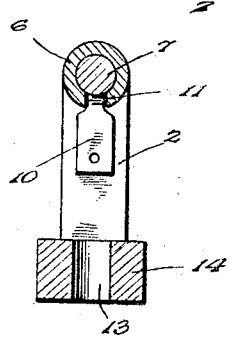
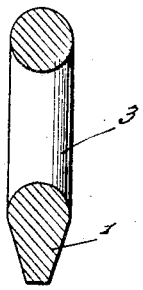
Inventor
J. M. Pericle.
By
Lacy & Lacy, Attorney Patented May 18, 1926.

1,585,314

UNITED STATES PATENT OFFICE.

JESSE M. PERICLE, OF HUTCHINSON, MINNESOTA.

SNAP HOOK.

Application filed August 5, 1925. Serial No. 48,355.

This invention relates to a snap hook intended to be principally used in connection with a lead staff employed when conducting a bull from one place to another.

One object of the invention is to provide a hook which will be very strong in its construction and permitted of being securely fastened to the lead staff with the forward end portion of the hook extending from the staff.

Another object of the invention is to so form the hook that the latch bolt will be normally projected to an operative position but may be readily retracted and secured in the retracted position.

Another object of the invention is to so construct the hook that it may be attached to a hitching chain or the like instead of to a lead staff.

This invention is illustrated in the accompanying drawings, wherein

Figure 1 is a view showing the hook principally in side elevation and partly in longitudinal section.

Fig. 2 is a longitudinal sectional view taken on the line 2—2 of Figure 1.

Fig. 3 is a transverse sectional view taken on the line 3—3 of Figure 1.

Fig. 4 is a sectional view taken on the line 4—4 of Figure 1.

The longitudinally extending shank portion 1 of the hook is formed at its rear end with an upstanding eye 2 which is thickened so that there will be no danger of its being readily broken and permits the hook to be connected with a chain. At its forward end the shank is curved upwardly and back upon itself to provide a bill 3 which is shaped in cross section as shown in Figs. 2 and 4, in order to give added strength and has its free end portion formed with a socket 4. A post or strut 5 extends upwardly from the shank intermediate the eye and bill and supports the forward end of a tubular bolt housing 6 which extends longitudinally of the shank and has its rear end portion formed integral with and supported by the eye 2. It should be noted that the rear end portion of the tubular housing extends in overlapping relation to the eye and that the portion of the eye directly beneath the housing is thickened so that a very strong connection is provided between the eye and the housing. A latch bolt 7 is slidably mounted in the tubular housing and is normally projected out of the forward end of the housing and held in the closed position shown in Figure 1, by a spring 8 disposed in the housing between the inner end of the bolt and the removable plug 9 screwed into the rear end portion of the housing. When in the extended position the forward end of the bolt fits into the socket 4 and therefore the bolt is braced against transverse movement by the bill of the hook and in its turn serves to brace the bill of the hook. It will thus be seen that there is no danger of the bill or bolt being bent so that they do not aline properly with each other. In order to engage the bill of the hook with the nose ring of the bull it is necessary to retract the bolt. In order to do so there has been provided a trigger 10 which extends through a slot 11 formed longitudinally of the housing between the eye and post 5 and at its rear end provided with a side extension 12 into which the trigger may be moved in order to secure the bolt in the retracted position. It will be obvious that when the bolt is retracted the spring will be compressed and will serve to quickly project the bolt when the trigger is moved out of the side extension 12 and released. The hook is to be secured longitudinally upon the forward end portion of a lead staff and therefore the portion of the shank between the eye 2 and post 5 has been flattened and formed with openings 13 adapted to receive bolts or other suitable fasteners. The portions 14 of the shank through which the openings 13 are formed have been widened as shown in Figure 2 so that this portion of the shank will not be weakened and there will be no danger of the snap hook being broken.

Having thus described the invention, what I claim is:

A snap hook comprising a shank having an upstanding eye at its rear end and its forward end portion extended upwardly and rearwardly to form an overlapping bill, the upper forward portion of said eye being thickened, a post extending upwardly from said shank intermediate said eye and bill and rigid with the shank, said shank being provided between the post and eye with openings to receive fasteners whereby the hook may be secured longitudinally upon a staff, a sleeve extending between said post and eye with its forward end portion rigid with the upper end of the post and its rear end portion overlapping the thickened forward portion of the eye and rigid therewith, the under portion of said sleeve being formed with a longitudinally extending slot, a closure for the rear end of said sleeve, a bolt slidable longitudinally in said sleeve and of a length to bridge the space between the bill and forward end of the sleeve with its rear end in overlapping relation to the forward end portion of said slot, a spring in said sleeve engaging the inner end of said bolt to yieldably resist rearward movement thereof, and a trigger carried by said bolt and extending through said slot whereby said bolt may be retracted.

In testimony whereof I affix my signature.

JESSE M. PERICLE.